Aug. 19, 1958   M. H. RHODES   2,848,711
MEANS FOR PROVIDING LINEAR INDICATIONS OF SHAFT
ROTATIONS GREATER THAN NINETY DEGREES
Filed Feb. 28, 1957
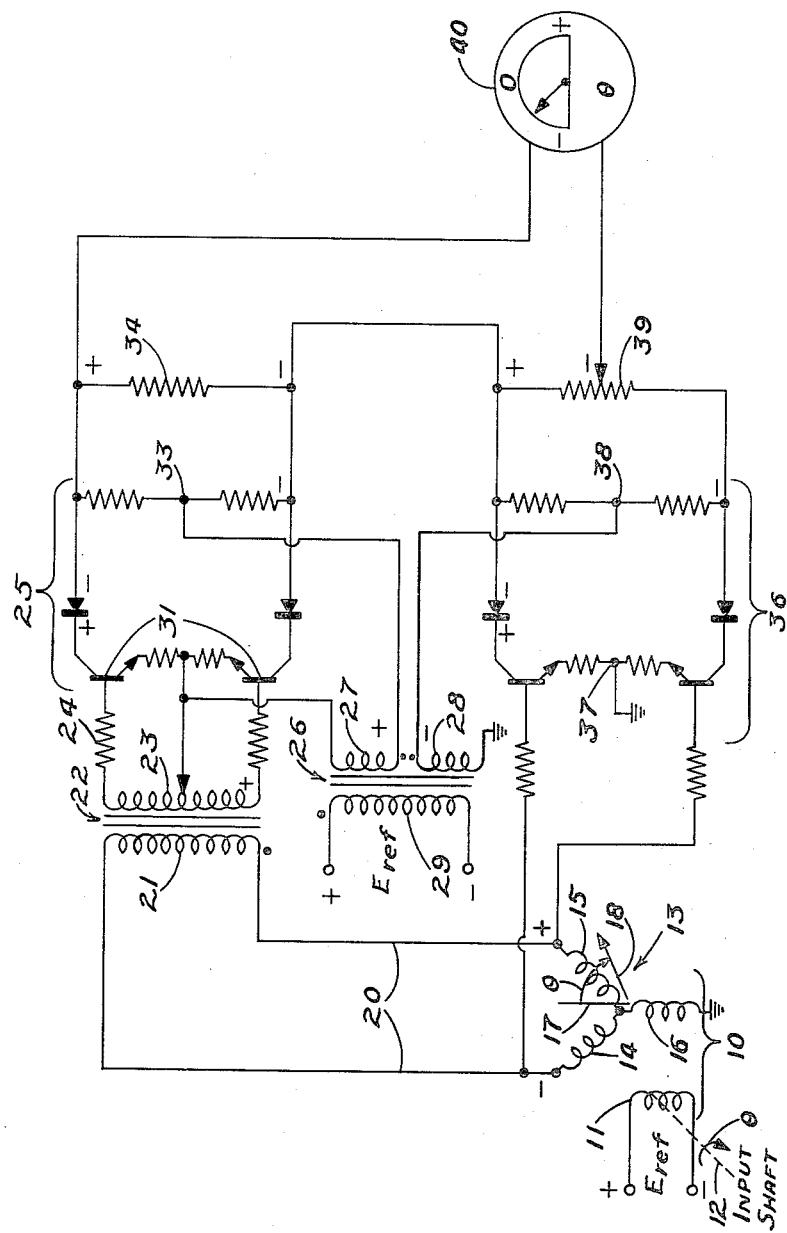
INVENTOR.
MELVIN H. RHODES
BY
ATTORNEYS

United States Patent Office 2,848,711
Patented Aug. 19, 1958

2,848,711

MEANS FOR PROVIDING LINEAR INDICATIONS OF SHAFT ROTATIONS GREATER THAN NINETY DEGREES

Melvin H. Rhodes, Cedar Rapids, Iowa, assignor to Collins Radio Company, Cedar Rapids, Iowa, a corporation of Iowa Application February 28, 1957, Serial No. 643,010

3 Claims. (Cl. 340—207)

This invention relates to indicator systems and more particularly to translating systems for indicating electrically a static mechanical shaft position.

Prior art systems of this nature have been relatively successful for indicating a shaft rotation up to sixty degrees from an ititial null point. Shaft rotations beyond sixty degrees, however, have suffered seriously from non-linearity in the indication. Rotations beyond ninety degrees have resulted in either ambiguity or non-sensical indications.

Accordingly, it is an object of this invention to provide a means for translating a shaft rotation into an electrical current, which current varies substantially linearly as a function of shaft rotations of up to approximately one hundred and ten degrees in either direction.

It is a further object of the invention to provide a system having good linearity characteristics over a wide range of input shaft rotation.

It is a further object of the invention to provide an indicator system having high reliability, low power consumption, and light weight for use such as in airborne instruments.

It is a feature of the invention that a plurality of phase sensitive detectors are connected to a synchro for converting the electrical output of the synchro into a current which polarity and amplitude indicate the mechanical rotation applied to the synchro rotor.

Further objects, features, and advantages of the invention will become apparent from the following description and claims when read in conjunction with the drawing in which the single figure shows a circuit diagram embodying the invention.

In the figure a synchro 10 is used as the mechanical-to-electrical transducer. Synchro 10 has a rotor 11 with an input shaft 12. The input shaft 12 is rotatably mounted so as to have as little friction as possible. The rotor 11 is inductively coupled to the stator 13. The stator is composed of three windings, 14, 15, and 16, which are equally space-distributed about the circumference of the rotor. The three stator windings are connected in Y with the free terminal of one winding (16) connected to ground. An index line 17 is shown together with an arrow 18 which represents a position of the maximum magnetic field from rotor 11 as will be discussed later. Rotor 11 is excited electrically by a reference alternating voltage source.

Connected to the free terminals of windings 14 and 15 are a pair of lines 20. These lines connect a line-to-line voltage of the Y to the primary 21 of a transformer 22. The secondary 23 of transformer 22 is center-tapped and so produces a push-pull voltage which is a function of the line-to-line voltage of the synchro Y. A phase discriminator 25 is connected to the secondary 23 by means of resistors 24 which also establish the operating point of the discriminator transistors.

A second transformer 26 has two isolated secondary windings 27 and 28. The primary winding 29 is connected to the same reference voltage as is rotor 11.

In discriminator 25, a pair of NPN transistors 31 are arranged in push-pull relationship, with the base electrodes connected to the ends of winding 23 through biasing resistors 24. The transistor emitters are connected to a common point 32 through resistors, as is the center tap of winding 23. In series, in the collector circuits of the transistors are load resistors and diodes. The diodes enhance the unilateral conduction characteristics of the transistors. The load resistors are connected together at point 33 for connection to winding 27 for energization of the transistor. Winding 27 is connected between common point 32 and point 33 to energize the phase discriminator circuit with a reference voltage of the proper phase. This phase is selected with reference to the output voltage of the synchro on lines 20 to give an output voltage which rises from zero as a function of rotation of shaft 12 from its zero reference. Thus, the voltage across the two load resistors in series indicates by polarity and magnitude the direction and extent of rotation of shaft 12. An additional resistor 34 shunts the output circuit of the discriminator 25 for establishment of the desired impedance level. The magnitude of the voltage developed across resistor 34 is substantially a linear function, as will be found in prior circuits, for rotations of the input shaft 12 up to sixty degrees.

An additional phase discriminator 36, having transistors in push-pull similar to those of phase discriminator 25, is connected directly through its base resistors to the same terminals of the synchro stator as are lines 20. The central point 37 of the emitter circuit is grounded. The central point 38 of the load resistors is connected to winding 28 of transformer 26. The other side of winding 28 is grounded, completing the energizing circuit for this pair of transistors. Use of the tap of output resistor 39 provides an adjustment of the output voltage of discriminator 36 added into the meter circuit. It is to be noted that the base-to-base voltages at the discriminator 36 are related to ground whereas the base-to-base voltages of discriminator 25 are related to one phase of the equivalent delta of the same pair of lines.

The voltages of the two discriminators are added in series by connection of the two output resistors 34 and 39 in series. A meter 40 monitors this series circuit. Meter 40 is a zero center meter indicating to right or left of the zero the positive or negative currents flowing in the meter circuit. The magnitude of the meter indication is calibrated in terms of the input shaft's rotation $\theta$.

In operation, the circuit translates the mechanical position of input shaft 12 into an electrical quantity for indication on meter 40. Index line 17 on the stator of the synchro shows the position of the magnetic field of rotor 11 relative to the stator windings 14 through 16.

In this position no voltage appears across the lines 20 since equal and opposite voltages are induced in windings 14 and 15. Similarly, equal voltages appear with respect to ground since the voltages of windings 14 and 16, and of windings 15 and 16 are equal and of the same phase. Thus, with rotor 11 positioned at zero position 17, the voltage applied to discriminator 25 is zero, and no output across resistor 34 develops. The two voltages applied to disriminator 36 are both out of phase relative to the phase reference voltage across winding 28. With such an input, the transistors of discriminator 36 are both cut off so that no voltage is developed across resistor 39. Meter 40 stands at zero indicating the null or zero reference position of the input shaft 12.

Assume, however, a shaft rotation $\theta$, moving the magnetic field of rotor 11 to the position shown as arrow 18. This position is assumed to be somewhat greater than sixty degrees. On shaft rotation from zero, the voltage line-to-line of lines 20 increases from zero. The voltages in the secondary 23 of transformer 22 have the polarities shown, the lower transistor thus having a base voltage applied which makes the transistor conduct. This conduction develops a voltage drop across the related load resistor and, therefore, across the output resistor 34 in the polarity shown. Were the polarity of the voltage on line 20 to be of the opposite polarity, the polarity of the direct voltage across resistor 34 would be reversed, indicating shaft rotation in the opposite direction.

The new voltages induced in the stator winding by the rotor in position 18 have different magnitudes and phases from the voltages related to position 17, relative to ground. As the rotor moves past thirty degrees rotation from the zero point, the voltage in windings 14 and 16 change polarity, while the voltage of winding 15 remains of the same polarity. The sums of the voltages on windings 14 and 16, and 15 and 16 go through zero and maximum, respectively, at sixty degrees. The phase of the sum of windings 14 and 16 changes, also. Until the rotor turns past sixty degrees, both of the transistors of discriminator 36 are cut off. Due to the phase change at sixty degrees, the lower transistor now has a potential applied which causes it to conduct. This condition results in a voltage drop across the lower load resistor yielding an output voltage, of the polarity shown, across resistor 39.

As the output voltage of discriminator 25 drops off a linear indication in a sine fashion, the output voltage of discriminator 36 continues to build up until the rotor nears a position an additional sixty degrees beyond, whereupon discriminator 36 suffers a similar sine fall-off from linearity. The sum of the two voltages, however, is substantially linear for input shaft rotations of up to about one hundred and ten degrees. An adjustable amount of voltage across resistor 39 is utilized in compensating the linearity as accurately as possible.

Thus is achieved a means for providing linear indication of shaft rotations of up to one hundred and ten degrees in either direction from a null point. This translation from mechanical to electrical energy is extremely useful such as in aircraft applications where the bank of the aircraft can be sensed by a gyro, translated by this system, and indicated by an electrical instrument on the panel before the pilot.

Although this invention has been described with respect to particular embodiments thereof, it is not to be so limited because changes and modifications may be made therein which are within the full intended scope of the invention as defined by the appended claims.

I claim:

1. Shaft rotation indicator means comprising a synchro having an input rotor mounted on a rotatable shaft and a stator, said stator having three terminals with one terminal grounded, a first discriminator means connected across the two ungrounded terminals, said first discriminator means having an output, a second phase discriminator being connected between said ungrounded terminals and said ground, said second discriminator having an output, the outputs of said first and second discriminators being connected in series, and means in said output circuit for indicating the rotation of said shaft from a reference position.

2. Shaft indicator means comprising an input shaft having a rotation to be indicated, synchro means having a rotor and a stator, said rotor being coupled to said input shaft, a reference voltage exciting said rotor, said stator having three terminals, one of which is grounded, first phase sensing means, means coupling said first phase sensing means to said ungrounded terminals, said first phase sensing means indicating the phase of the voltage between said ungrounded terminals relative to said reference voltage, second phase sensing means indicating the phase of the voltages relative to ground of said ungrounded terminals with respect to said reference voltage, a series circuit including the outputs of said first and second phase sensing means and a zero center meter for indicating the position of said input shaft relative to a reference point.

3. A means for providing linear indication of shaft rotation comprising a synchro having an input shaft, a rotor mounted on said input shaft, and a stator; a phase reference voltage exciting said rotor, said stator having three terminals, one of which is grounded, a first phase sensing means having an input, an output and including a pair of electronic devices in push-pull, said pair being excited in-phase by a portion of said phase reference voltage, means connecting the input of said first phase sensing means to said ungrounded terminals whereby said input is driven in push-pull by the voltage between said ungrounded terminals, a second phase sensing means having an input, an output and including a second pair of electronic devices in push-pull, said second pair being excited in-phase by a portion of said phase reference voltage, means connecting the input of said second phase sensing means to said ungrounded terminals whereby said input is driven in push-pull by said terminal-to-ground voltages, said output circuits being connected in a series circuit including meter means for indicating the rotation of said shaft from a null point.

No references cited.